Aug. 17, 1937.  D. W. SHERMAN  2,090,461
SPRING HANGER ATTACHMENT FOR AUTOMOBILE FRAMES
Filed Nov. 30, 1936

Donald W. Sherman
INVENTOR.

BY *[signature]*
ATTORNEY.

Patented Aug. 17, 1937

2,090,461

UNITED STATES PATENT OFFICE 2,090,461

SPRING HANGER ATTACHMENT FOR AUTOMOBILE FRAMES

Donald W. Sherman, Shorewood, Wis., assignor to A. O. Smith Corporation, Milwaukee, Wis., a corporation of New York Application November 30, 1936, Serial No. 113,344

3 Claims. (Cl. 280—106)

This invention relates to a spring hanger attachment for automobile frames, and it has been specifically applied to the construction of the spring hanger for the forward end of the rear spring.

Heretofore difficulty has been encountered in mounting a spring hanger bearing within the channel of the side rail and between the vertical web of the side rail and the vertical web of a reenforcing plate or channel or of the end of a cross bar. Where a tubular bearing is welded in holes in the respective webs the cost has been excessive and warpage necessitates reaming of the bearing for alignment after assembly.

The object of the present invention is to provide a simple, efficient and economic construction of the spring hanger attachment.

The preferred embodiment of the invention is illustrated in the accompanying drawing in which.

Figure 1:
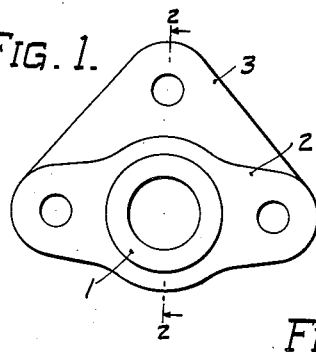
Figure 1 is a side elevation of the spring hanger.
Figure 2:
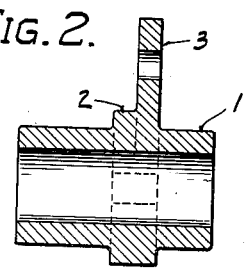
Fig. 2 is a section on line 2—2 of Fig. 1.
Figure 3:
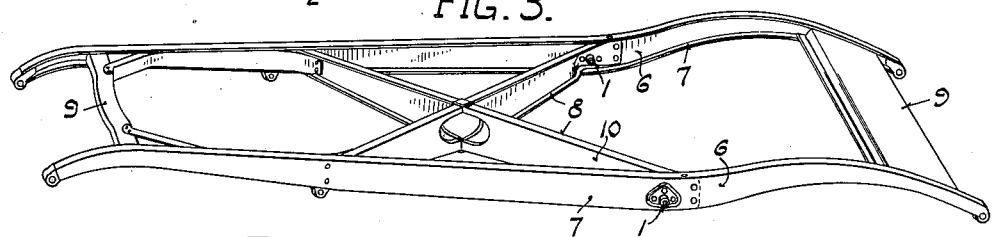
Fig. 3 is a perspective view of an automobile frame showing the spring hangers attached.
Figure 4:
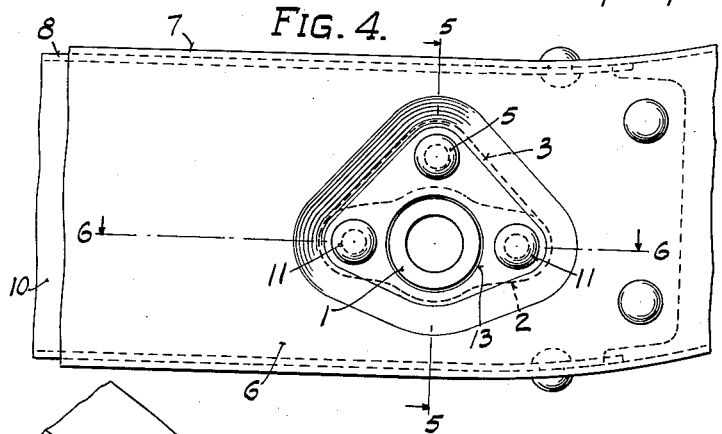
Fig. 4 is a side elevation of the portion of a channel side rail having the spring hanger attached.
Figure 5:
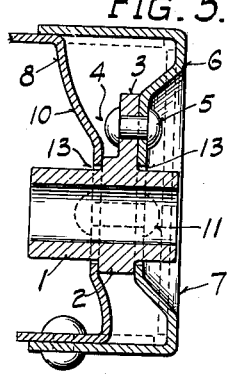
Fig. 5 is a detail section on line 5—5 of Fig. 4.
Figure 6:
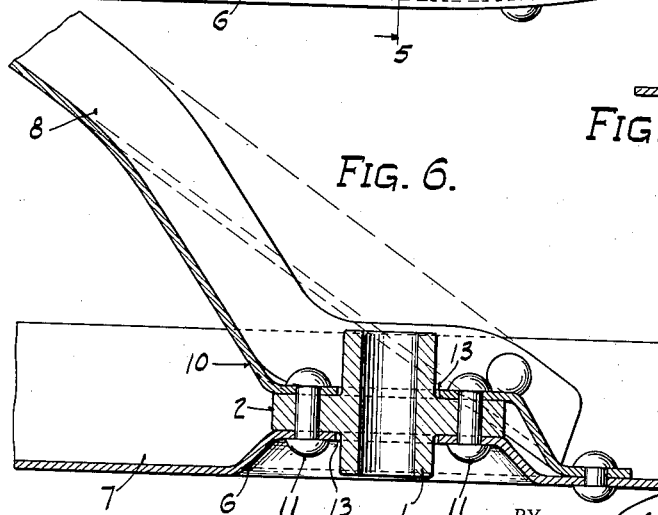
Fig. 6 is a detail section on line 6—6 of Fig. 4.

The spring hanger is preferably of cast construction and has a tubular bearing 1 and a thick flange 2 extending on opposite sides of the bearing in a plane normal to the axis of the bearing. The supporting flange 2 is preferably located near the center of the bearing to properly transmit loads without torsional stresses.

An additional thin flange 3 is provided as a part of the flange 2, but providing a recess 4 for receiving the head of a locating rivet 5. In assembling, the spring hanger is first attached by means of the rivet 5 to the vertical web 6 of the side rail 7 of the frame. Then the side rails are assembled with the cross bars 8 and 9. The vertical web 10 of the cross bar 8 engages the side of the thick flange 2 and long rivets 11 secure the webs 6 and 10 and the intermediate flange 2 permanently together.

Figure 7:
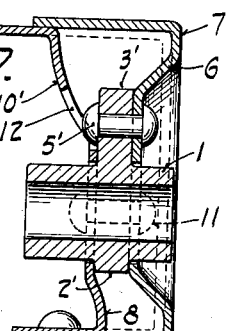
Fig. 7 is a section similar to Fig. 5 showing a modified form of attachment.

In the modified form of attachment shown in Fig. 7, the flange 3' is of the same thickness as flange 2'. The web 10' of the cross bar has an opening 12 for receiving the head of rivet 5'.

In all constructions it is preferable to have the web 6 of the side rail formed inwardly so as to position the flange 3 or 3' more nearly in the central plane of the rail. The webs 6 and 10 and also 10' have large openings 13 for receiving the tubular bearing 1.

Various embodiments of the invention may be employed within the scope of the claims.

I claim:

1. In an automobile frame, a structural member having two vertical webs provided with aligned openings, a spring hanger bearing member extending between said webs in alignment with said openings, a flange on said bearing member engaging both webs, and means passing through said webs and said flange for permanently securing said members together.

2. In an automobile frame, a structural member having two vertical webs provided with aligned openings, a spring hanger bearing member extending between said webs in alignment with said openings, a flange on said bearing member engaging both webs, a portion of said flange being recessed, means passing through said recessed portion of said flange and one of said webs to fasten said hanger in place during assembly, and means passing through said webs and said flange for permanently securing said members together.

3. In an automobile frame, a channel shaped side rail having an opening through its vertical web, a spring hanger having a tubular bearing member in the channel of said side rail and extending through said opening, a flange on said bearing member at about its mid-plane, the vertical web of said channel side rail being formed inwardly to engage said flange, means securing said spring hanger to said side rail for assembly purposes, a cross bar having a vertical web entering the channel of said side rail and engaging said flange, and means passing through said vertical webs and flange for permanently securing the parts together.

DONALD W. SHERMAN.